United States Patent [19]

Türi et al.

[11] 4,299,136

[45] Nov. 10, 1981

[54] LOCKING SYSTEM FOR TWO BRAKE PEDALS OF A MOTOR VEHICLE MOUNTED ON A COMMON SHAFT

[75] Inventors: Julius Türi, Weiler; Erich Stotz, Rommelshausen, both of Fed. Rep. of Germany

[73] Assignee: Dr. Ing. h.c.F. Porsche AG, Stuttgart, Fed. Rep. of Germany

[21] Appl. No.: 139,542

[22] Filed: Apr. 11, 1980

[30] Foreign Application Priority Data

Apr. 20, 1979 [DE] Fed. Rep. of Germany ........ 2916011

[51] Int. Cl.³ .......................... B60T 7/06; B62D 11/08
[52] U.S. Cl. .................................... 74/478.5; 74/512; 188/16; 188/354; 180/6.24
[58] Field of Search .............. 180/315, 320, 334, 6.24, 180/6.2; 188/16, 354; 74/562.5, 562, 480 R, 478.5, 478, 512

[56] References Cited

U.S. PATENT DOCUMENTS 3,181,388  5/1965  Riddy .................................. 74/478

FOREIGN PATENT DOCUMENTS 1555394  2/1971  Fed. Rep. of Germany .
1580030  9/1973  Fed. Rep. of Germany .
881693  11/1961  United Kingdom .................. 74/562

OTHER PUBLICATIONS

Lastauto-Omnibus, Stuttgart, Sonderheft, Sep. 1969, p. 182.

*Primary Examiner*—John A. Pekar
*Attorney, Agent, or Firm*—Craig and Antonelli

[57] ABSTRACT

Locking system for two brake pedals of a motor vehicle such as a tractor, for enabling joint and separate actuation of opposite wheel pairs of the type wherein a bolt is utilized to couple the pedals. In accordance with a preferred embodiment, the bolt is spring biased into a locked position and is operable by the foot of the driver so as to be shifted into an unlocked position. These positions are assumed through the use of stops that are staggered with respect to one another both radially and axially and are mounted so as to be brought into contact with a side wall of one of the pedals by rotational and axial movements of the bolt.

13 Claims, 4 Drawing Figures

LOCKING SYSTEM FOR TWO BRAKE PEDALS OF A MOTOR VEHICLE MOUNTED ON A COMMON SHAFT

BACKGROUND AND SUMMARY OF THE INVENTION

The invention relates to a locking system for two brake pedals of a motor vehicle mounted on a common shaft, especially of a tractor (i.e., a tractor section of a tractor-trailer unit), by means of which opposite pairs of wheels, preferably the rear wheels of the vehicle, can be actuatable jointly and/or separately, depending on the position of a pin in the system.

A known locking system of the above-mentioned design (German Auslegeschrift No. 1,580,030) merely comprises a projecting bolt which is introduced into or removed from openings in the pedal in appropriate operating situations. This design not only suffers from the disadvantage that the bolt can come loose spontaneously from its designated position as a result of the vibration of the vehicle, but also that its actuation (locking and unlocking) is accomplished exclusively manually, forcing the driver usually to adopt an inconvenient position.

An object of the invention is thus to provide a locking system for brake pedals which is simple in design and contributes to a higher comfort.

This object is achieved according to a preferred embodiment of the invention by virtue of the fact that a bolt, which abuts a spring, is provided with a first stop and a second stop to assume a locked and an unlocked position, said stops being staggered with respect to one another axially and radially, and being brought to bear against a side wall of a pedal running transversely to the lengthwise axis of the bolt by rotational and axial movements of the bolt. It is of advantage in this connection if two bearing eyes are provided to support the bolt on a pedal. An eye is provided on the other pedal, and the bolt enters this eye in the locked position. The spring surrounds the bolt, is designed as a compression spring and is disposed between the two eyes, whereby it abuts an eye at one end and a disc on the bolt at the other. The first stop is formed by a bend in the bolt. The second stop is formed by a bend in a pin welded to the bolt. The pin has a section which runs parallel to the bolt, said section being prevented from rotating in the locked position by a guide element on the pedal. When it abuts the side wall, the stop rests against a locking part and is held in place by means of a projection with a spherical section. In addition, the stops project beyond the side wall of the pedal.

The principal advantages achieved with the invention include the fact that the arrangement and design of the bolt and the stops create a locking system which the driver can easily operate with his foot and therefore improves comfort. The mechanical parts are protected, for example, against contamination, by being located behind the footrest plate of the pedal. The stops are formed by parts which are simple in construction. The guiding element of the pedal and the arrangement of the pin relative to the bolt ensure that improper actuation is ruled out.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
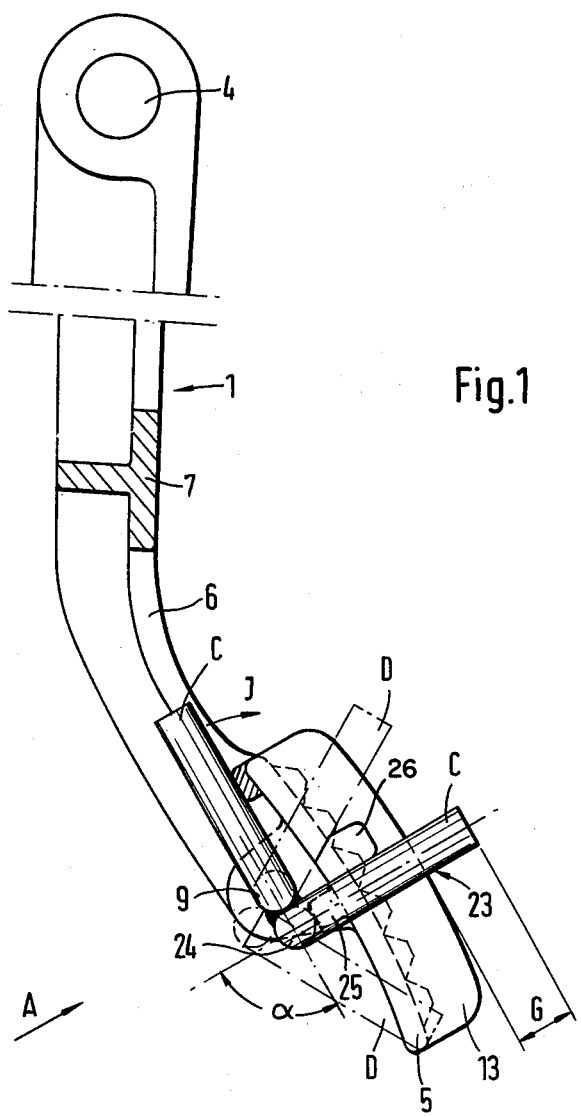
FIG. 1 is a side view of a brake pedal arrangement using the locking system according to the invention.
Figure 2:
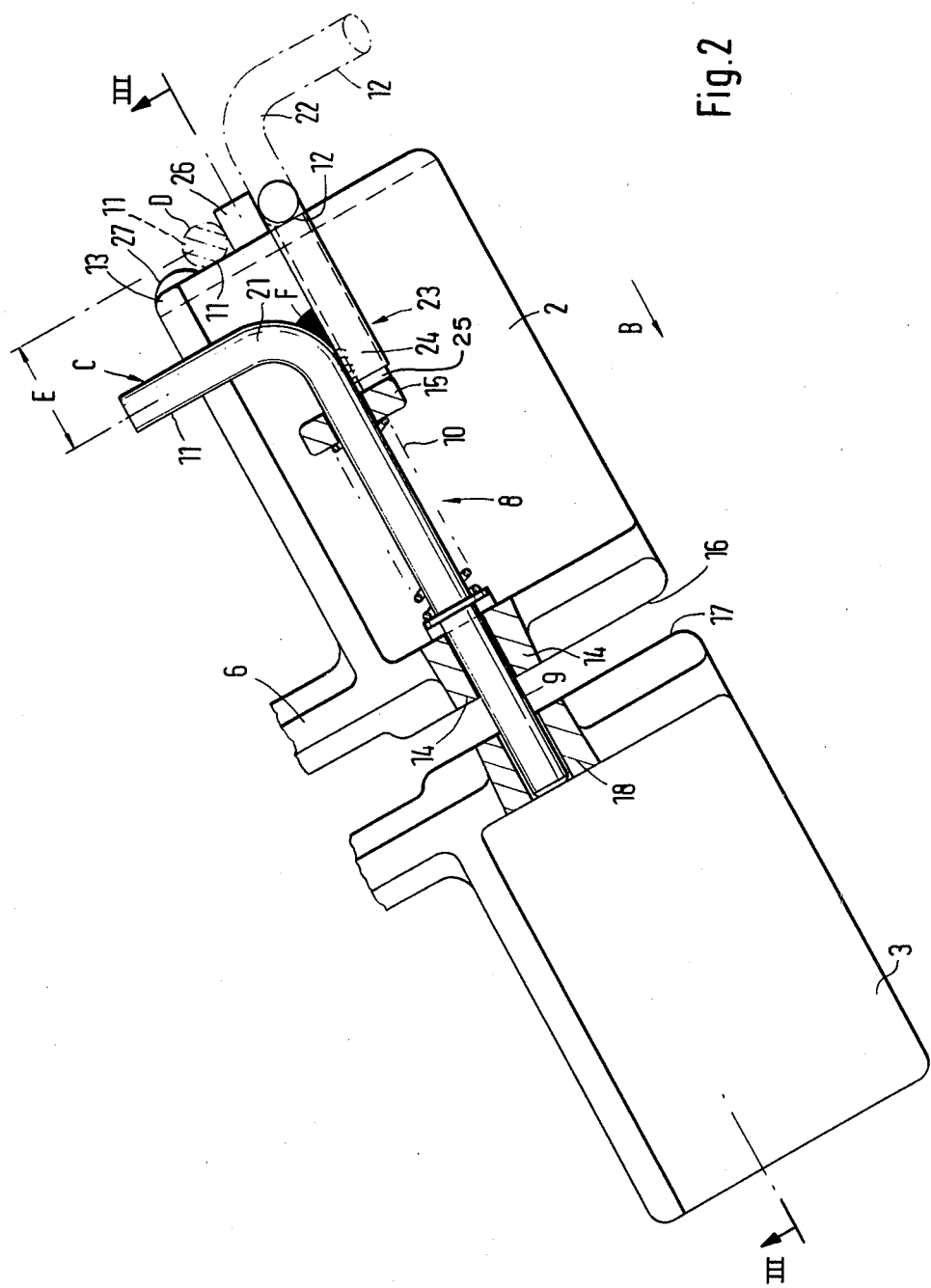
FIG. 2 is a view in the direction of arrow A in FIG. 1.
Figure 3:
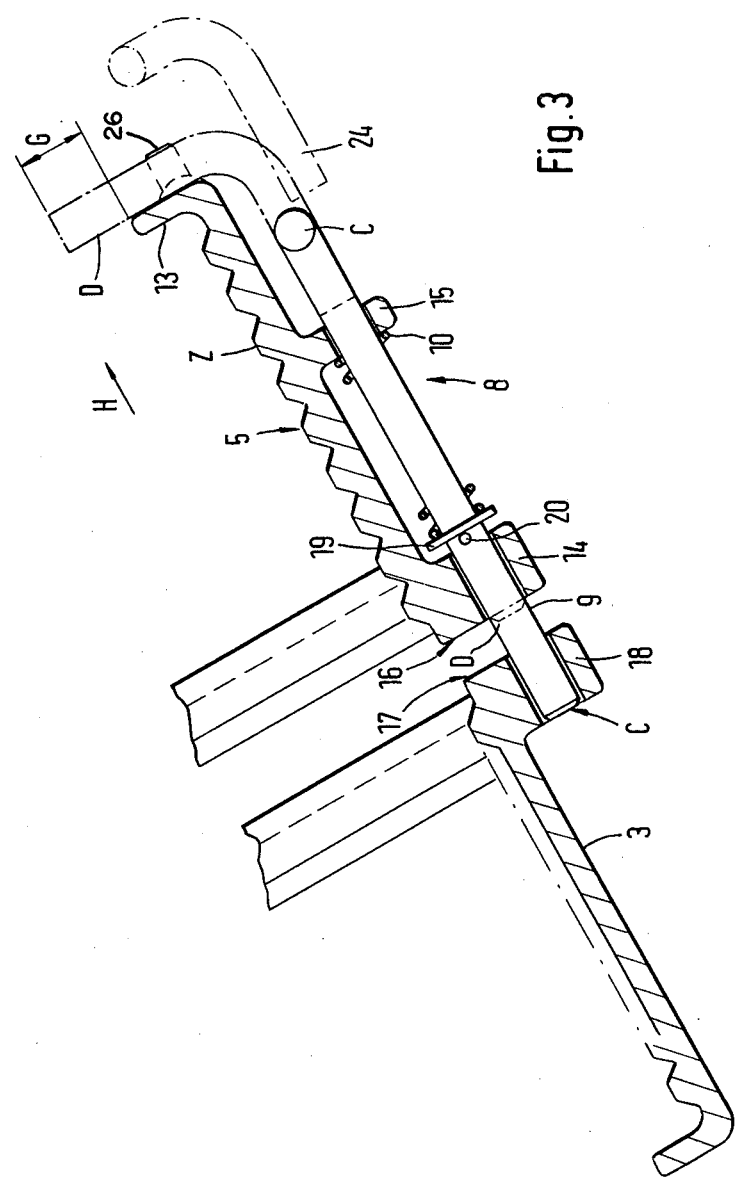
FIG. 3 is a cross section through the brake pedal along line III—III in FIG. 2 with the bolt shown in full view.

The brake pedal arrangement 1 comprises two brake pedals 2 and 3, suspended from a common shaft 4. Brake pedals 2 and 3 are operable either jointly or separately, whereby each pedal, for example, pedal 2, has a foot support plate 5 and a support 6 extending between the shaft 4 and the foot support plate 5, the cross section of said support being indicated at 7.

Pedals 2 and 3 are actuated separately when certain operating situations require opposite wheel pairs, preferably rear wheels, to be braked independently of one another to assist in steering.

For this purpose, a locking system 8 is provided between pedals 2 and 3, said system comprising a bolt 9 with a circular cross section. This bolt is urged in direction B by a spring 10 and has a first stop 11 and a second stop 12 to maintain a locked position C or unlocked position D. Stops 11 and 12 are arranged with space E located axially between them. They extend radially at an angle α to one another (approximately at right angles in the illustrated embodiment).

Stops 11 and 12 abut a side wall 13 of foot support plate 5 of pedal 2, depending on the position (C or D). Bearing eyes 14 and 15 are formed on pedal 2 to accept bolt 9, said eyes being further located on the side of foot support plate 5 which faces support 6. Pedal 3 comprises an eye 18, into which bolt 9 enters in the locked position C. Eye 18 is located on a side 17 of pedal 3 that faces a side 16 of pedal 2 at which eye 14 is located.

Spring 10 surrounds bolt 9, is designed as a compression spring and is disposed between eyes 14 and 15. It abuts eye 15 at one end and a disc 19 at the other, said disc being held in position by means of a locking pin 20 on bolt 9.

Stop 11 is formed by a bend 21 in bolt 9. Stop 12 is also formed by a bend 22. However, the latter bend is provided on a pin 23 which is welded to bolt 9 at F. In addition, pin 23 has a section 24 which runs parallel to bolt 9.

Figure 4:
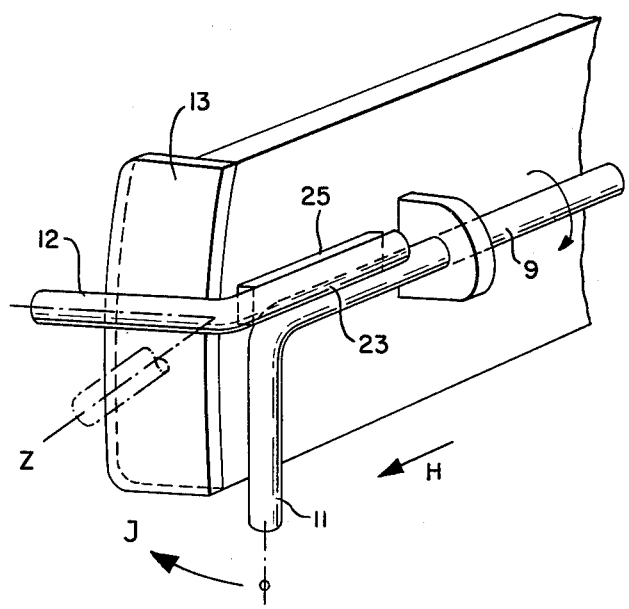
FIG. 4 is a perspective of one pedal of the brake pedal arrangement viewed from below and to one side thereof.

Section 24 is guided in its locked position C by means of a guide element 25 which is fastened to foot support plate 5. As best seen from FIG. 4, guide element 25 extends from bearing eye 15 to near the edge of the pedal 2 between section 24 and the bottom of pedal 2. Thus, since section 24 is radially offset from the axis of rotation of bolt 9 and therefore must move into the position occupied by guide 25 for movement counter to direction J to occur, the guide 25 effectively precludes such counter-movement until distance E has been traveled. On the other hand, if guide 25 were omitted, the undesirable situation could occur where stop 12 is shifted counter to direction J into position Z (broken lines FIG. 4). In position Z the stop 12 juts over side wall 13 to such a small degree that control thereof is very difficult, and counter-movement beyond that point would render foot control of bolt 9 virtually impossible. When first stop 11 abuts side wall 13, it also abuts a locking part 26 and is held in place by means of a partially spherical projection 27.

In order to ensure smooth operation, stops 11 and 12 project at a distance G above side wall 13. The distance G preferably is 10 to 30 mm, but this value can be varied so long as the stops project beyond pedal 2 a sufficient distance to enable shifting thereof by the driver's foot.

If separate actuation of pedals 2 and 3 is desired, the bolt is displaced axially in direction H until stop 11 has reached approximately the height of projection 27. Then bolt 9 is rotated in direction J about this lengthwise axis whereby stop 11 comes to rest against side wall 13. This is the unlocked position D. If it is then desired to return to the locked position C, bolt 9 is rotated opposite to direction J, overcoming projection 26. As soon as stop 11 is free, the bolt moves back into its locked position C under the influence of spring 10 and stop 12 is then against side wall 13.

The invention is not limited to the embodiment shown. Thus, for example, it is also possible to move the bolt to its end positions by remote control, located, for example, on the dashboard.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Locking system for two brake pedals of a motor vehicle, such as a tractor, for enabling joint and separate actuation of opposite wheel pairs, depending on the position of a bolt in the system, characterized by the fact that means associated with one of said pedals is provided for mounting the bolt for axial and rotational movement with respect to the pedals and the bolt is operable to connect said two pedals in a locked position and to separate the pedals in an unlocked position, and comprises a first stop and a second stop for use in assuming said locked and unlocked positions, respectively, said stops being staggered with respect to one another axially and radially, and being mounted so as to be brought into contact, by rotational and axial movements of said bolt, with a side wall of said one of the pedals that runs transversely with respect to a longitudinal axis of said bolt.

2. Locking system according to claim 1, characterized by the fact that two bearing eyes are provided to mount said bolt on said one pedal.

3. Locking system according to claim 2, characterized by the fact that said bearing eyes are disposed beneath a foot rest plate on said one pedal.

4. Locking system according to claim 2, characterized by the fact that an eye is provided on the other of said two pedals in which the bolt is received in the locked position.

5. Locking system according to claim 2, characterized by the fact that a compression spring surrounds said bolt and is disposed between the two eyes on said one pedal so as to abut one eye at one end and a disc on said bolt at another end.

6. Locking system according to claim 1, characterized by the fact that the first stop is formed by a bend in said bolt.

7. Locking system according to claim 1 or 2, characterized by the fact that the second stop is formed by a bend in a pin welded to said bolt.

8. Locking system according to claim 7, characterized by the fact that said pin comprises a section running parallel to said bolt, said section, when said bolt is in the locked position, being prevented from rotating in a direction away from said unlocked position by a guide element on said one pedal.

9. Locking system according to claims 1 or 6, characterized by the fact that the first stop, when it abuts said side wall, abuts a locking part and is held in position by a partially spherical projection.

10. Locking system according to claims 1 or 6, characterized by the fact that stops project beyond the side wall of said one pedal in said locked and unlocked position.

11. Locking system according to claim 10, wherein said pedals extend beyond said sidewalls by a distance of 10-30 mm.

12. Locking system according to claim 9, characterized by the fact that stops project beyond the side wall of said one pedal in said locked and unlocked positions.

13. Locking system according to claim 12, wherein said pedals extend beyond said sidewalls by a distance of 10-30 mm.

* * * * *